(12) United States Patent
Isomura et al.

(10) Patent No.: US 9,325,722 B2
(45) Date of Patent: Apr. 26, 2016

(54) APPARATUS, METHOD, AND COMPUTER-READABLE MEDIUM

(71) Applicant: FUJITSU LIMITED, Kawasaki-shi, Kanagawa (JP)

(72) Inventors: Norikazu Isomura, Numazu (JP); Takashi Saito, Yokohama (JP); Naohiro Itou, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/297,752

(22) Filed: Jun. 6, 2014

(65) Prior Publication Data

US 2015/0040186 A1 Feb. 5, 2015

(30) Foreign Application Priority Data

Jul. 30, 2013 (JP) ................................ 2013-157734

(51) Int. Cl.
*H04L 29/06* (2006.01)

(52) U.S. Cl.
CPC ............ *H04L 63/107* (2013.01); *H04L 63/108* (2013.01)

(58) Field of Classification Search
None
See application file for complete search history.

(56) References Cited

U.S. PATENT DOCUMENTS

| 6,038,571 A | 3/2000 | Numajiri et al. |
| 7,797,679 B2* | 9/2010 | Tysowski et al. ............. 717/121 |
| 2004/0093506 A1* | 5/2004 | Grawrock et al. ............ 713/189 |
| 2010/0030782 A1* | 2/2010 | Shoji et al. ........................ 707/9 |
| 2010/0299547 A1* | 11/2010 | Saika .................... G06F 1/3203 713/324 |
| 2012/0020307 A1* | 1/2012 | Henderson ............ H04W 28/16 370/329 |
| 2012/0095797 A1* | 4/2012 | Nishimura et al. .......... 705/7.13 |
| 2014/0331286 A1* | 11/2014 | Davis et al. ....................... 726/4 |

FOREIGN PATENT DOCUMENTS

| JP | 8-314786 | 11/1996 |
| JP | 9-269902 | 10/1997 |
| JP | 10-289134 | 10/1998 |
| JP | 2000-259567 | 9/2000 |

* cited by examiner

*Primary Examiner* — Kaveh Abrishamkar
(74) *Attorney, Agent, or Firm* — Staas & Halsey LLP

(57) ABSTRACT

An apparatus includes a memory; and a processor coupled to the memory and configured to: set an indicator so that the indicator indicates an access to data is allowed when a start time of time zone arrives, the access to the data being allowed when time is within the time zone; set the indicator so that the indicator indicates the access to the data is not allowed when an end time of the time zone arrives; and determine whether to allow the access to the data on the basis of the indicator when the access of the data is requested.

14 Claims, 18 Drawing Sheets

USER INFORMATION 401-1

| USER NAME | NUMBER OF TABLES | AUTHORITY INFORMATION TABLE POINTER |
|---|---|---|
| USER A | 3 | |

AUTHORITY INFORMATION TABLE 402-1

| TABLE NAME | AUTHORITY | PERMISSION TIME PERIOD | ACCESS PERMISSION INFORMATION |
|---|---|---|---|
| TABLE (1) | REFERENCE, UPDATE | 9:00-17:00 | ○ |
| TABLE (2) | REFERENCE, UPDATE | 9:00-17:00 | ○ |
| TABLE (3) | REFERENCE | 18:00-22:00 | × |

USER INFORMATION 401-2

| USER NAME | NUMBER OF TABLES | AUTHORITY INFORMATION TABLE POINTER |
|---|---|---|
| USER B | 2 | |

AUTHORITY INFORMATION TABLE 402-2

| TABLE NAME | AUTHORITY | PERMISSION TIME PERIOD | ACCESS PERMISSION INFORMATION |
|---|---|---|---|
| TABLE (1) | REFERENCE, UPDATE | 9:00-17:00 | ○ |
| TABLE (2) | REFERENCE, UPDATE | 9:00-17:00 | ○ |

FIG. 7

USER INFORMATION 401

| USER NAME | NUMBER OF TABLES | AUTHORITY INFORMATION TABLE POINTER |
|---|---|---|
| USER A | 0 | 0 |
| USER B | 0 | 0 |
| USER X | 0 | 0 |

APPARATUS, METHOD, AND COMPUTER-READABLE MEDIUM

CROSS-REFERENCE TO RELATED APPLICATION

This application is based upon and claims the benefit of priority of the prior Japanese Patent Application No. 2013-157734, filed on Jul. 30, 2013, the entire contents of which are incorporated herein by reference.

FIELD

The embodiments discussed herein are related to an apparatus, a method, and a computer-readable medium.

BACKGROUND

Access to a database is managed by authority that is defined in, for example, relationship between a subject and an object. The subject is a user authenticated by a system that manages access. For such user authentication, various manners of authentication, such as matching decision between, for example, a user identification string and a password string, are used. The object is a database entity subject to access. The object is structured by, for example, columns making up a table and is sometimes abstracted by an operation command to a database management system that is not intended for a specific object.

Access authority management is system operation carried out in many systems, and there is a case that only the user identification string and the password string in the past are insufficient. For example, there is a case of carrying out operation, such as server stop at night, to completely inhibit access to a database at night, so that an idea of available time (clock time) for access authority is sometimes introduced.

In order to introduce the concept of available time for authority into access authority management, current clock time is obtained every time when accessing a table for determination, for example. In addition, when working with a database, a query to direct joining to a plurality of tables and the like are sometimes specified, so that access authority check including clock time confirmation per table subject to access turns out to be carried out.

As a related technique in the past, there is a technique, for example, to determine availability of reference to a database based on a user name set in a process that issues a query, a database name, a file name, and an item name specified by the query, and clock time when the query is issued. In addition, there is a technique in which access attributes including time information are set in an access attribute file and then the access attribute file is referred by a file access function that is activated every time accessing a file subject to access to carry out decision of access permission including time information. There is also a technique in which, when there is a demand for access to a file, access availability is decided based on information included in the access demand, and a user ID, a password, a permission time period, and a terminal ID that are registered in an access management table. Still in addition, there is a technique in which, after releasing a page frame that is not accessed by the processor since the last scan, pageout daemon process to be in a sleep state is dispatched at predetermined intervals.

Japanese Laid-open Patent Publication Nos. 10-289134, 8-314786, 2000-259567, and 9-269902 are examples of related art.

SUMMARY

According to an aspect of the invention, an apparatus includes a memory; and a processor coupled to the memory and configured to: set an indicator so that the indicator indicates an access to data is allowed when a start time of time zone arrives, the access to the data being allowed when time is within the time zone; set the indicator so that the indicator indicates the access to the data is not allowed when an end time of the time zone arrives; and determine whether to allow the access to the data on the basis of the indicator when the access of the data is requested.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 illustrates one example of user information that is registered by the flowchart in FIG. 6;

DESCRIPTION OF EMBODIMENTS

Firstly, descriptions are given to consideration by the inventor. According to related techniques, when a concept of time is introduced into access authority management of a database system, a processing load for data access increases. For example, when current clock time is obtained by calling a system call of an operating system (OS) every time a database server accesses data to check whether or not it is in a permitted time period, a number of calling a system call of the OS increases in proportion to the number of accesses, which increases the processing load for data access.

According to examples described later, an effect of suppressing an increase of a processing load related to access control based on a time period is exhibited.

Detailed descriptions are given below to embodiments of an access control program, an access control method, and a system according to the present disclosure with reference to the drawings.

First Embodiment

One Example of Access Control Method

Figure 1:
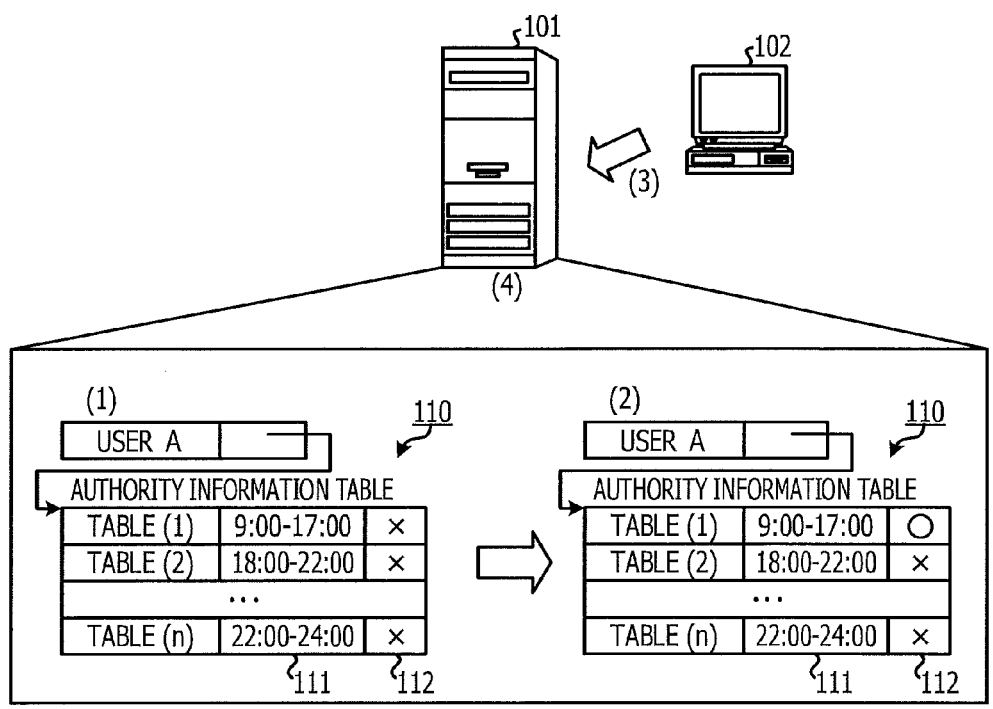
FIG. 1 illustrates one example of an access control method according to a first embodiment.

FIG. 1 illustrates one example of an access control method according to the first embodiment. In FIG. 1, a database server 101 is a computer that accepts an access demand (query) from a client terminal 102 to a database, for example, a structured query language (SQL) statement and responds with a result of the query to the client terminal 102.

The client terminal 102 is a computer that issues a query by a user operation. The database stores data that is shared by a plurality of applications and users. For example, a relational database represents a collection of data in the form of table having columns. The plurality of applications and users are capable of carrying out data search and update by coupling tables by setting relationship between the tables.

In the present embodiment, an access authority management mechanism of the database is extended to introduce a concept of time into access authority. Specifically, a time period when access authority becomes available is set in data in the database. In the descriptions below, descriptions are given using an example of a table in a database as one example of the data in the database. Access authority regarding time becomes unavailable when out of the regulated time even without carrying out a deprivation operation.

When determining data, access, and a plan of an SQL statement (when translating an SQL statement), the database server 101 tests access authority of the table specified by the SQL statement and performs testing of access authority regarding time when accessing the table. Descriptions are given below to an access control processing example of the database server 101.

(1) The database server 101 gives a permission time period 111 indicating a time period to permit access to a table and access permission information 112 indicating whether or not to permit access to the table at the current clock time to an authority information table 110. The authority information table 110 is provided, for example, per user.

In addition, the access permission information 112 is, for example, flag information indicating whether or not to permit access to a table. In the descriptions below, the access permission information 112 indicating that access to a table is permitted may be described as "access permission (O)" and the access permission information 112 indicating that access to a table is not permitted may be described as "access non-permission (X)". The access permission information 112 is in access non-permission (X) in the initial state.

In the example of FIG. 1, permission time periods 111 of a table (1), a table (2), . . . , and a table (n) are defined in the authority information table 110 of the user A. Specifically, for example, the table (1) is permitted to access only in a time period of "9:00-17:00", the table (2) is permitted to access only in a time period of "18:00-22:00", and the table (n) is permitted to access only in a time period of "22:00-24:00". At the current clock time, the access permission information 112 of all the table (1), the table (2), . . . , and the table (n) is in access non-permission (X).

(2) The database server 101 updates the authority information table 110. Specifically, for example, at starting clock time of the permission time period 111 that is defined in a table, the database server 101 updates the access permission information 112 of the table to access permission (O) in the background. At ending clock time of the permission time period 111 that is defined in a table, the database server 101 updates the access permission information 112 of the table to access non-permission (X) in the background.

In the example of FIG. 1, the database server 101 updates the access permission information 112 of the table (1) to access permission (O) at, for example, "9:00". The database server 101 also updates the access permission information 112 of the table (1) to access non-permission (X) at, for example, "17:00".

(3) The database server 101 accepts an access demand for the database from the client terminal 102. Here, assumption is made for a case that the database server 101 accepts an access demand for the table (1) in the database from the client terminal 102 used by the user A in a time period of "9:00-17:00".

(4) The database server 101 controls access to a table in the database by referring to the authority information table 110 of a user that uses the client terminal 102. Specifically, for example, when the access permission information 112 of the table is in access non-permission (X), the database server 101 makes the access as non-permission due to being out of permission time returns an error. In contrast, when the access permission information 112 of a table is in access permission (O), the database server 101 permits the access to continue the data access. In the example of FIG. 1, the database server 101 refers to the authority information table 110 of the user A, and as the access permission information 112 of the table (1) is in access permission (O), permits the access to the table (1).

In such a manner, according to the database server 101, it is possible to update the access permission information 112 indicating whether or not to permit access to the table based on the permission time period 111 of the table. In addition, according to the database server 101, when an access demand from the client terminal 102 is accepted, it is possible to control access to the table based on the access permission information 112 of the table in an access destination. Thus, it becomes possible to carry out access control based on a time period without obtaining current clock time every time of access to a table, and it is possible to introduce a concept of time into access authority without causing great overhead.

System Configuration Example of System 200

Figure 2:
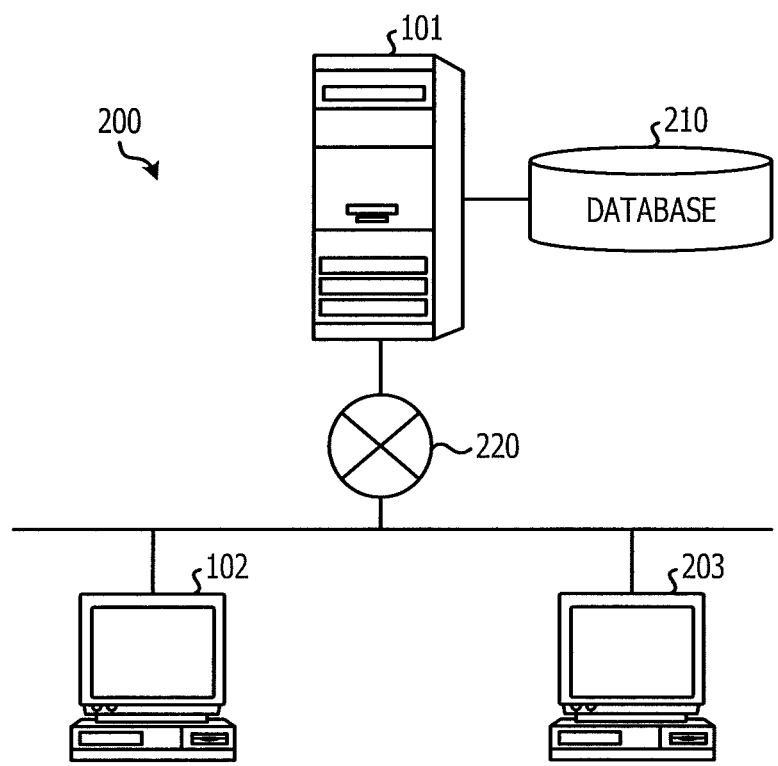
FIG. 2 illustrates a system configuration example of a system.

FIG. 2 illustrates a system configuration example of a system 200. In FIG. 2, the system 200 includes the database server 101, the client terminal 102, a management terminal 203, and a database 210. In the system 200, the database server 101, the client terminal 102, and the management terminal 203 are connected via a wired or wireless network 220. The network 220 is, for example, a local area network (LAN), a wide area network (WAN), the Internet, and the like.

The database server 101 is a computer that is capable of accessing the database 210. When receiving a demand for data search from the client terminal 102, for example, the database server 101 reads the data from the database 210 into a memory (for example, a memory 302 illustrated in FIG. 3 described later). Then, the database server 101 carries out search to the data read into the memory and sends the search result to the client terminal 102.

The client terminal 102 is a computer that is used by a user of the system 200. The management terminal 203 is a computer that is used by an administrator of the system 200. Specifically, the client terminal 102 is, for example, a personal computer (PC), a laptop PC, a smartphone, a mobile phone, a tablet PC, or the like.

Hardware Configuration Example of Database Server 101

Figure 3:
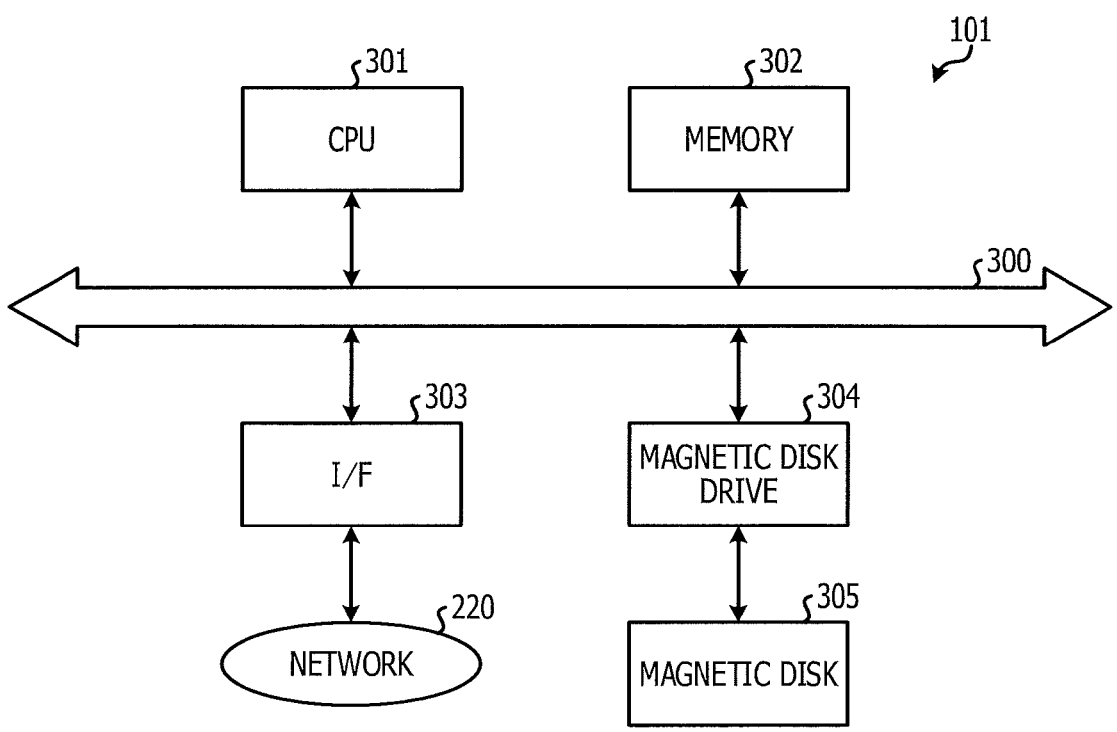
FIG. 3 is a block diagram illustrating a hardware configuration example of a database server.

FIG. 3 is a block diagram illustrating a hardware configuration example of the database server 101. In FIG. 3, the database server 101 has a central processing unit (CPU) 301, a memory 302, an interface (I/F) 303, a magnetic disk drive 304, and a magnetic disk 305. Each component is connected by a bus 300.

Here, the CPU 301 is in charge of overall control of the database server 101. The memory 302 has, for example, a read only memory (ROM), a random access memory (RAM), a flash ROM, and the like. Specifically, for example, a flash ROM or a ROM stores various programs and a RAM is used as a work area of the CPU 301. The program stored in the memory 302 is loaded into the CPU 301, thereby causing coded processing to be executed by the CPU 301.

The I/F 303 is connected to the network 220 through a communication line and connected to another computer (for example, the client terminal 102 and the management terminal 203 illustrated in FIG. 2) via the network 220. Then, the I/F 303 is in charge of an interface between the network 220 and inside and controls input/output of data from another computer. For the I/F 303, it is possible to employ, for example, a modem, a LAN adaptor, and the like.

The magnetic disk drive 304 controls read/write of data to the magnetic disk 305 in accordance with control of the CPU 301. The magnetic disk 305 stores data that is written by control of the magnetic disk drive 304.

The database server 101 may also have, for example, a solid state drive (SSD), a keyboard, a mouse, a display, and the like other than the components described above. It is possible to achieve the client terminal 102 and the management terminal 203 illustrated in FIG. 2 by a hardware configuration example similar to the database server 101 described above.

Stored Contents of Authority Setting Information 400

Next, descriptions are given to stored contents of authority setting information 400 that is used by the database server 101. The authority setting information 400 is stored in a storage device, such as the memory 302 and the magnetic disk 305 illustrated in FIG. 3, for example.

Figure 4:
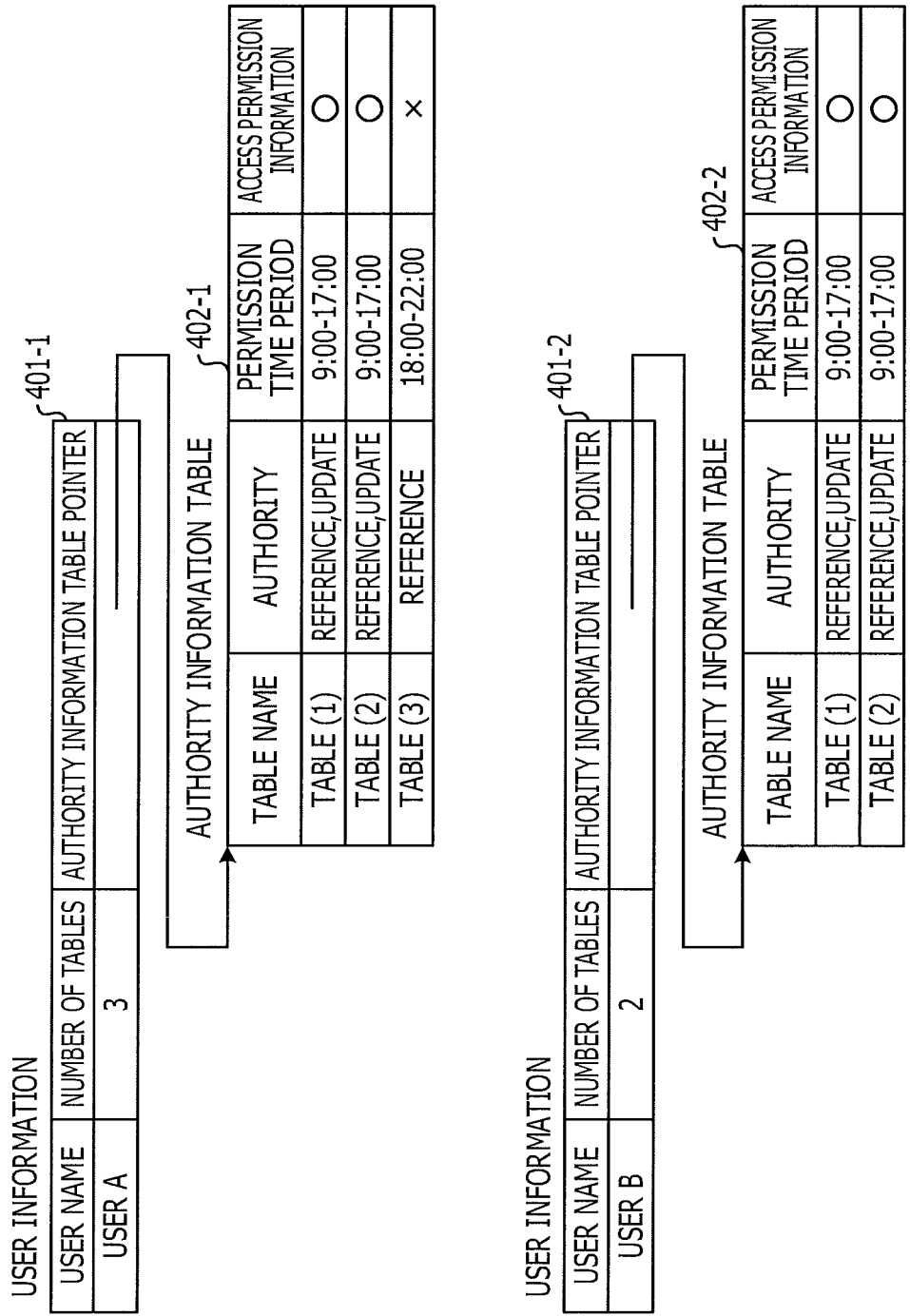
FIG. 4 illustrates one example of stored contents of authority setting information.

FIG. 4 illustrates one example of the stored contents of the authority setting information 400. In FIG. 4, the authority setting information 400 is configured to include user information 401 (for example, user information 401-1, 401-2) and an authority information table 402 (for example, authority information tables 402-1, 402-2).

The user information 401 has fields of a user name, a number of tables, and an authority information table pointer and sets information in each field, thereby storing information on a table per user.

Here, the user name is a user identifier that uniquely identifies users having authority to access the database server 101. The number of tables indicates a number of tables in which authority to users is regulated. The authority information table pointer is correspondence information indicating correspondence relationship between the user information 401 and the authority information table 402 in which the user authority is set. The authority information table pointer is a pointer that indicates, for example, an address in the memory 302 of the authority information table 402.

For example, the user information 401-1 stores user A in the user name, 3 in the number of tables, and a pointer to the authority information table 402-1 in the authority information table pointer. The user information 401-2 stores user B in the user name, 2 in the number of tables, and a pointer to the authority information table 402-2 in the authority information table pointer.

The authority information table 402 has fields of a table name, authority, a permission time period, and access permission information and stores information on user authority per table by setting information in each field.

Here, the table name is an identifier of a table that uniquely identifies tables stored in the database 210. The authority indicates authority permitted to a user in the user information 401 corresponding to the authority information table 402 for the table. In the authority, there are reference, update, and the like, for example. The permission time period indicates a time period to permit access to the table to a user. For example, it is possible to indicate the time period to permit with permission starting clock time and permission ending clock time. The access permission information indicates whether or not to permit access to the table to a user at the current clock time. For example, it is possible to permit access when "O" is set in the access permission information and not to permit access when "X" is set.

For example, the authority information table 402-1 has table (1) to table (3) as the table name. The authority information table 402-1 indicates that the user A is capable of referring to and updating the table (1) and the table (2), access is permitted in the time period of 9:00-17:00, and the access permission information is "O" and access is permitted at the current clock time. Similarly, the authority information table 402-1 indicates that the user A is capable of referring to the table (3), access is permitted in the time period of 18:00-22:00, and the access permission information is "X" and access is not permitted at the current clock time.

Functional Configuration Example of Database Server 101

Figure 5:
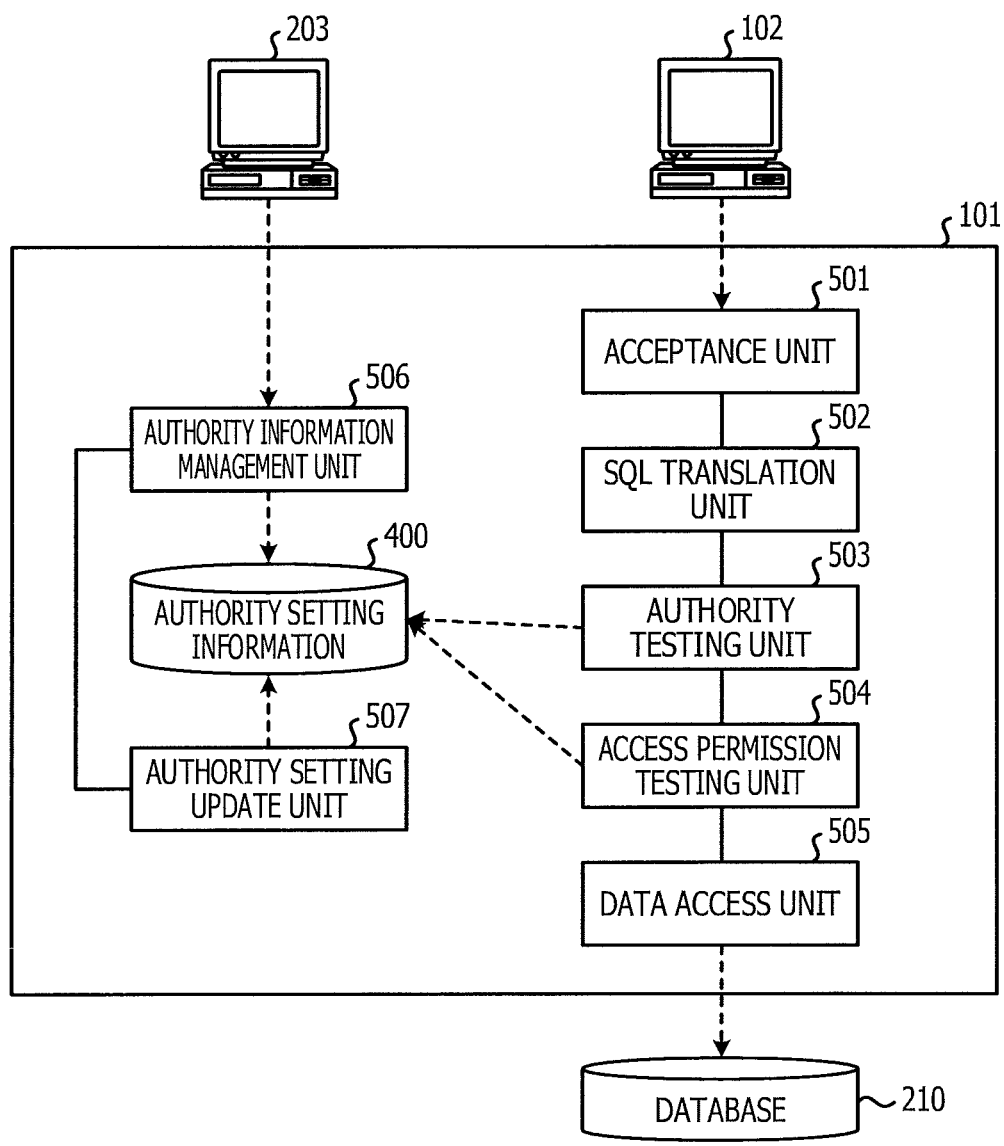
FIG. 5 is a block diagram illustrating a functional configuration example of the database server.

FIG. 5 is a block diagram illustrating a functional configuration example of the database server 101. In FIG. 5, the database server 101 is configured to include an acceptance unit 501, an SQL translation unit 502, an authority testing unit 503, an access permission testing unit 504, a data access unit 505, an authority information management unit 506, and an authority setting update unit 507. Each functional unit specifically achieves the function by, for example, causing a program stored in a storage device, such as the memory 302 and the magnetic disk 305 illustrated in FIG. 2 to be executed by the CPU 301 or by the I/F 303. A result of processing in each functional unit is stored in a storage device, such as the memory 302 and the magnetic disk 305 illustrated in FIG. 3, for example.

The acceptance unit 501 has a function that accepts an access demand for data from the client terminal 102. For example, a user executes an SQL statement and demands access to data in the database 210 via the network 220, and the acceptance unit 501 accepts the data access demand.

The SQL translation unit 502 has a function that creates a data access procedure from the data access demand. For example, from the SQL statement, a user name that accesses data, a table name desired for data access, and the like are extracted.

The authority testing unit 503 has a function that determines permission and non-permission of an access demand for a table to a user with reference to the authority field in the authority information table 402. The authority testing unit 503 passes the control to the access permission testing unit 504 when determination is made to permit the access demand, and ends the data access demand with an error when determination is made not to permit the access demand.

For example, when the user A demands reference access to the table (1) with the SQL statement, the authority testing unit 503 refers to the authority information table 402-1 indicating the authority of the table (1) of the user A, and as there is reference in the authority, determination is made to permit the access demand. When the user A demands update access to the table (3) with the SQL statement, the authority testing unit 503 refers to the authority information table 402-1 indicating the authority of the table (3) of the user A, and as there is no update in the authority, determination is made not to permit the access demand.

The access permission testing unit 504 has a function that determines whether or not it is in the permitted time period with reference to the access permission information in the authority information table 402. The access permission testing unit 504 passes the control to the data access unit 505 when determining as it is in the permitted time period, and ends the data access demand with an error when determining as it is not in the permitted time period. That is, the access permission testing unit 504 determines whether or not it is in the permitted time period in the state of access permission information without obtaining the current clock time every time of data access.

For example, when the user A demands reference access to the table (1) with the SQL statement, the access permission testing unit 504 refers to the authority information table 402-1 indicating the access permission of the table (1) of the user A, and as the access permission information is "O", determination is made as it is in the permitted time period. When the user A demands reference access to the table (3) with the SQL statement, the access permission testing unit 504 refers to the authority information table 402-1 indicating the access permission of the table (3) of the user A, and as the access permission information is "X", determination is made as it is not in the permitted time period.

The data access unit 505 has a function that accesses the database 210 in accordance with an access procedure that is created by the SQL translation unit 502 and replies with a data access result to the acceptance unit 501. The acceptance unit 501 sends the data access result to the client terminal 102.

The authority information management unit 506 has a function that registers and updates the fields of the user name, the number of tables, and the authority information table pointer in the user information 401-1 of the authority setting information 400. The authority information management unit 506 has a function that registers and updates the table name, the authority, and the permission time period in the authority information table 402 of the authority setting information 400. Further, the authority information management unit 506 has a function that registers the access permission information in the authority information table 402 of the authority setting information 400. For example, the administrator carries out a command operation to the database server 101 from the management terminal 203, thereby enabling registration and update.

The authority setting update unit 507 has a function that periodically updates the access permission information in the authority information table 402 of the authority setting information 400 based on the permission time period. For example, the authority setting update unit 507 is achieved as a process that runs in the background (daemon, service, and the like) and is activated when a database system is activated or authority information is updated. For example, in a case of the authority information table 402-1, the access permission information is updated to "O" at 9:00 and to "X" at 17:00.

Registration and Update of Authority Setting Information

Figure 6:
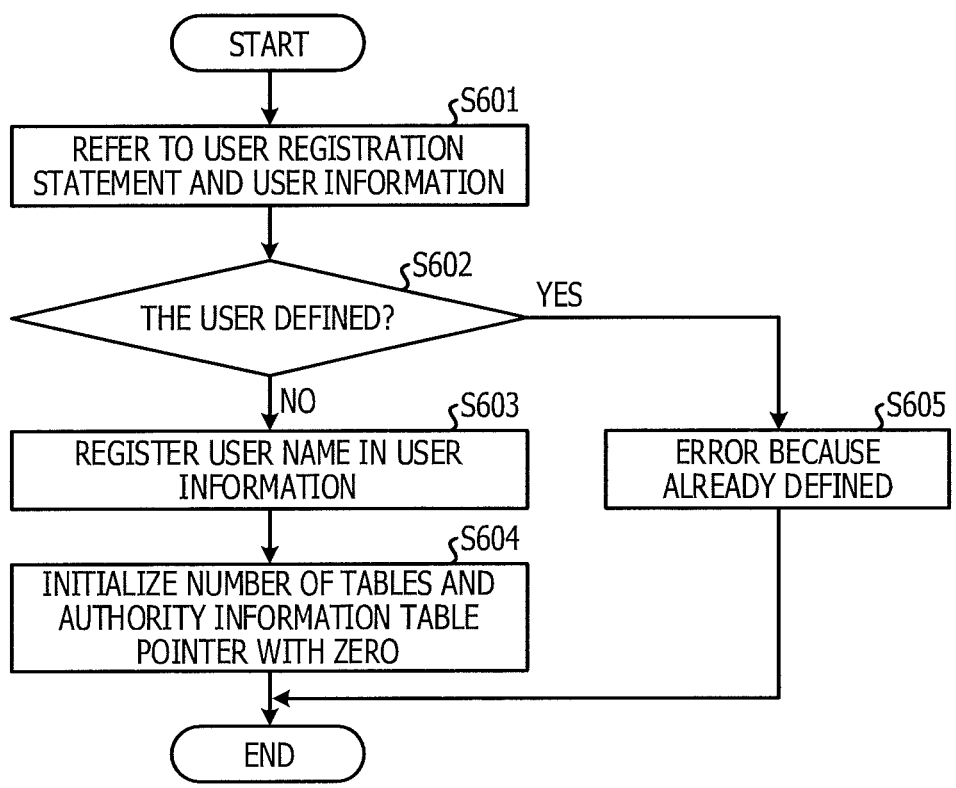
FIG. 6 is a flowchart illustrating one example of a user registration processing procedure of the authority setting information.

FIG. 6 is a flowchart illustrating one example of a user registration processing procedure of the authority setting information 400. Firstly, the authority information management unit 506 refers to a user registration statement (CREATE USER statement) and the user information 401 (step S601). The user registration statement is described as, for example, CREATE USER user A
CREATE USER user B
CREATE USER user X.

Next, the authority information management unit 506 confirms whether or not the user is defined already (step S602). Here, the process goes on to step S605 when a user is defined (yes in step S602), and the process goes on to step S603 when a user is not yet defined (no in step S602).

When a user is not yet defined, the authority information management unit 506 registers the user name in the user information 401 based on the user registration statement (step S603). Next, the number of tables and the authority information table pointer are initialized with zero (step S604). In contrast, when a user is defined, it ends with an error because the user is already defined (step S605). Thus, a series of processing by the present flowchart is terminated. By executing the present flowchart, the user name is registered in the user information 401. FIG. 7 illustrates one example of the user information 401 that is registered by the flowchart in FIG. 6.

Figure 8:
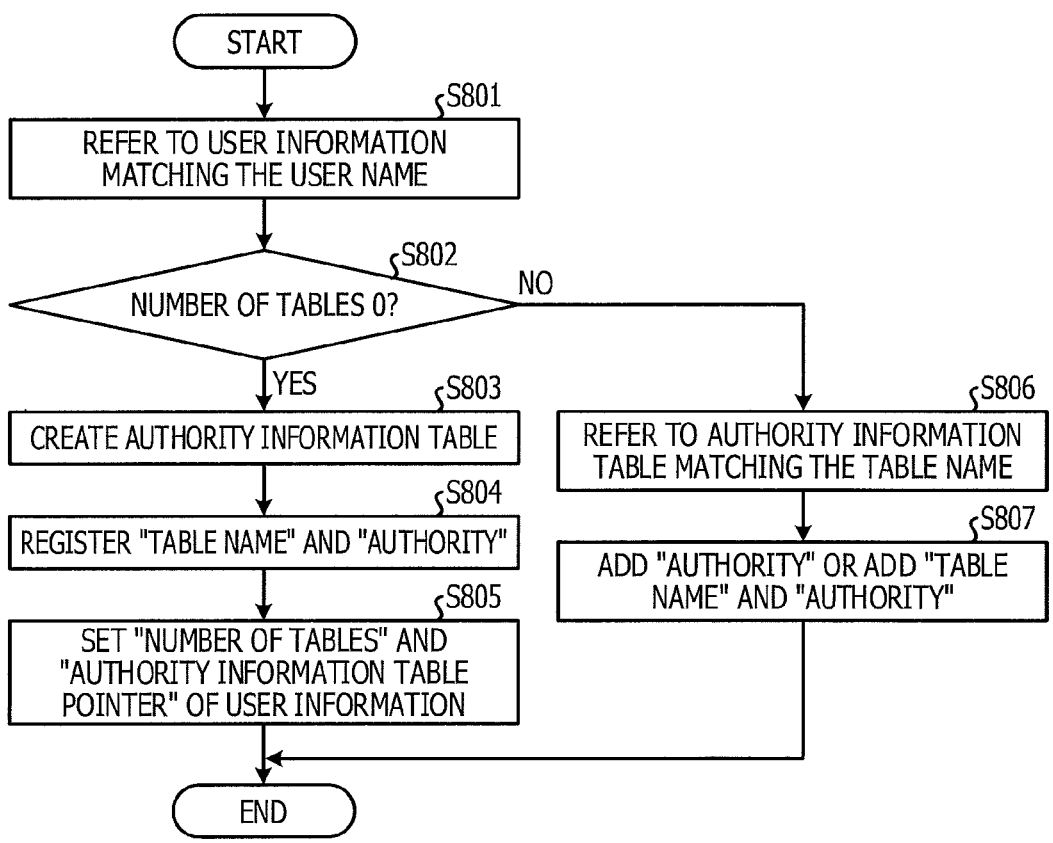
FIG. 8 is a flowchart illustrating one example of a user authority registration processing procedure of the authority setting information.

FIG. 8 is a flowchart illustrating one example of a user authority registration processing procedure of the authority setting information 400. Firstly, the authority information management unit 506 refers to user information 401 matching the user name based on an authority registration statement (GRANT statement) (step S801). The authority registration statement is described as, for example, GRANT SELECT ON master table TO user A, user B, user X GRANT INSERT ON transaction history table TO user A, user B, user X.

Next, the authority information management unit 506 confirms whether or not the number of tables in the user information 401 is 0 (step S802). Here, the process goes on to step S803 when the number of tables of the user information 401 is 0 (yes in step S802) and to step S806 when not 0 (no in step S802).

When the number of tables in the user information 401 is 0, the authority information management unit 506 creates the authority information table 402 (step S803) and registers the "table name" and the "authority" specified by the authority registration statement (step S804). Nothing is set in the "permission time period" and the "access permission information". Next, the authority information management unit 506 sets the "number of tables" and the "authority information table pointer" of the user information 401 (step S805).

Figure 9:
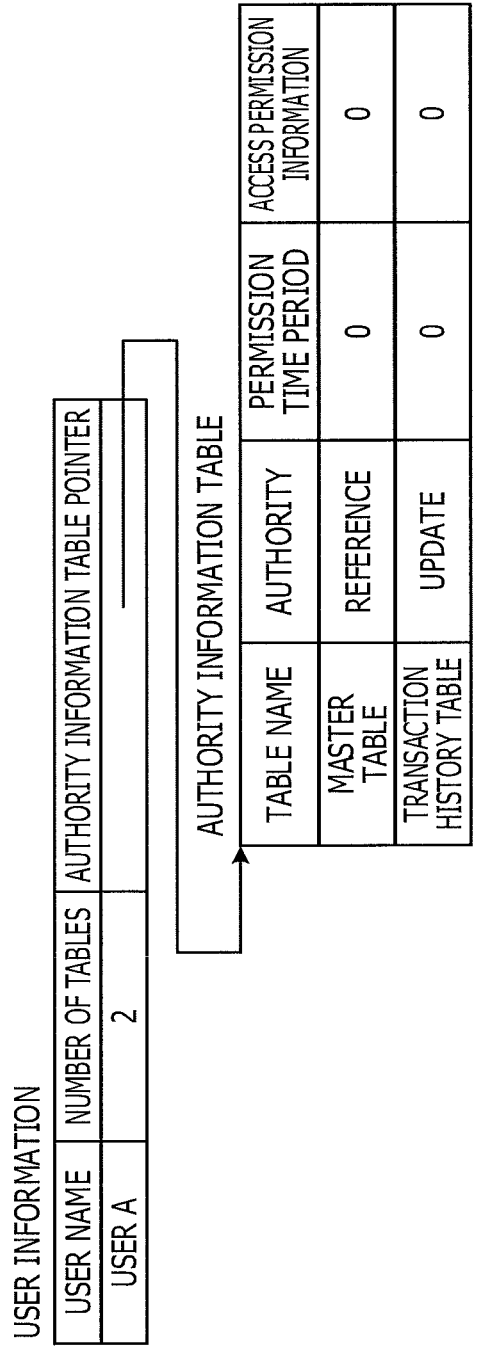
FIG. 9 illustrates one example of user authority of a user A that is registered by the flowchart in FIG. 8.

In contrast, when the number of tables in the user information 401 is not 0, the authority information management unit 506 refers to the authority information table 402 matching the table name based on the authority registration statement (step S806), and adds the "authority" specified in the authority registration statement to the registered "authority" when the table name is registered, and adds the "table name" and the "authority" specified in the authority registration statement when the table name is not yet registered (step S807). In this case as well, nothing is set in the "permission time period" and the "access permission information". Thus, a series of processing by the present flowchart is terminated. By executing the present flowchart, the table name and the authority are registered in the authority information table 402. FIG. 9 illustrates one example of the user authority of user A that is registered by the flowchart in FIG. 8.

Figure 10:
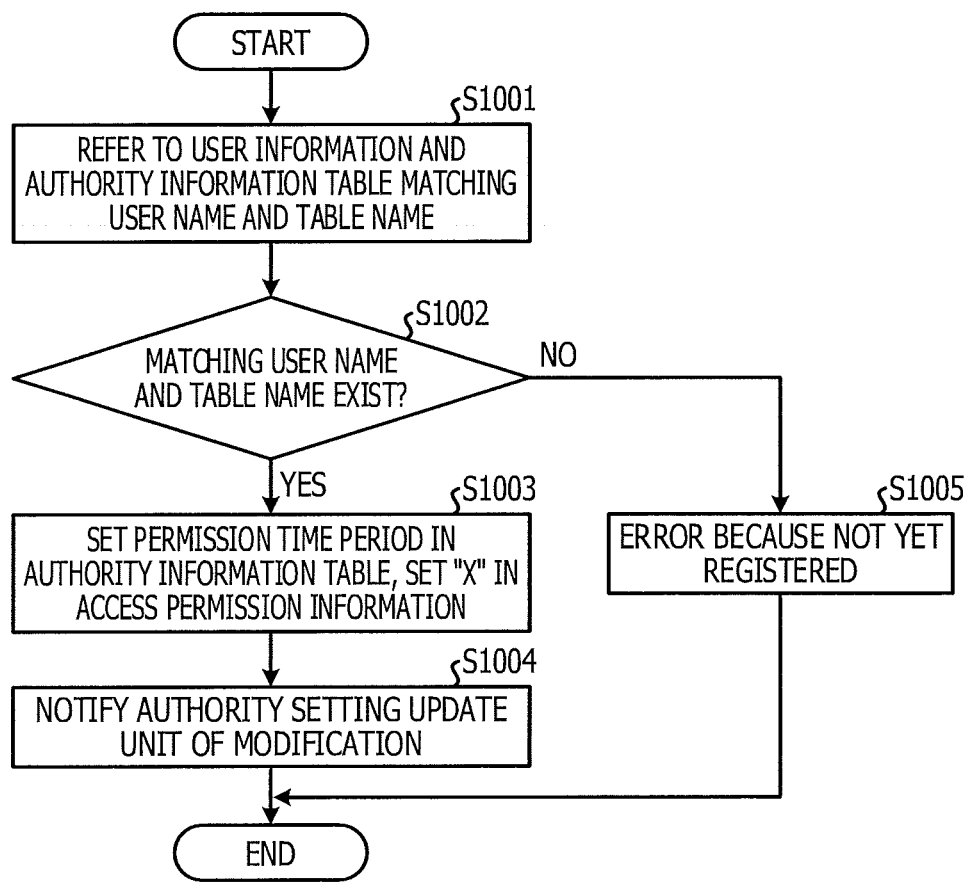
FIG. 10 is a flowchart illustrating one example of user permission time period registration processing procedure of the authority setting information.

FIG. 10 is a flowchart illustrating one example of a user permission time period registration processing procedure of the authority setting information 400. Firstly, the authority information management unit 506 refers to the user information 401 and the authority information table 402 matching the user name and the table name based on the authority registration statement (GRANT statement) (step S1001). The authority registration statement is described as, for example, GRANT PERMISSION_TIME TO user A ON TABLE master table, transaction history table WITH TIME_RANGE (9:00, 17:00)

GRANT PERMISSION_TIME TO user B ON TABLE master table, transaction history table WITH TIME_RANGE (9:00, 17:00).

Next, the authority information management unit 506 confirms whether or not there are matching user name and table name (step S1002). Here, the process goes on to step S1003 when there are the user name and the table name (yes in step S1002), and the process goes on to step S1005 when there is none (no in step S1002).

Figure 11:
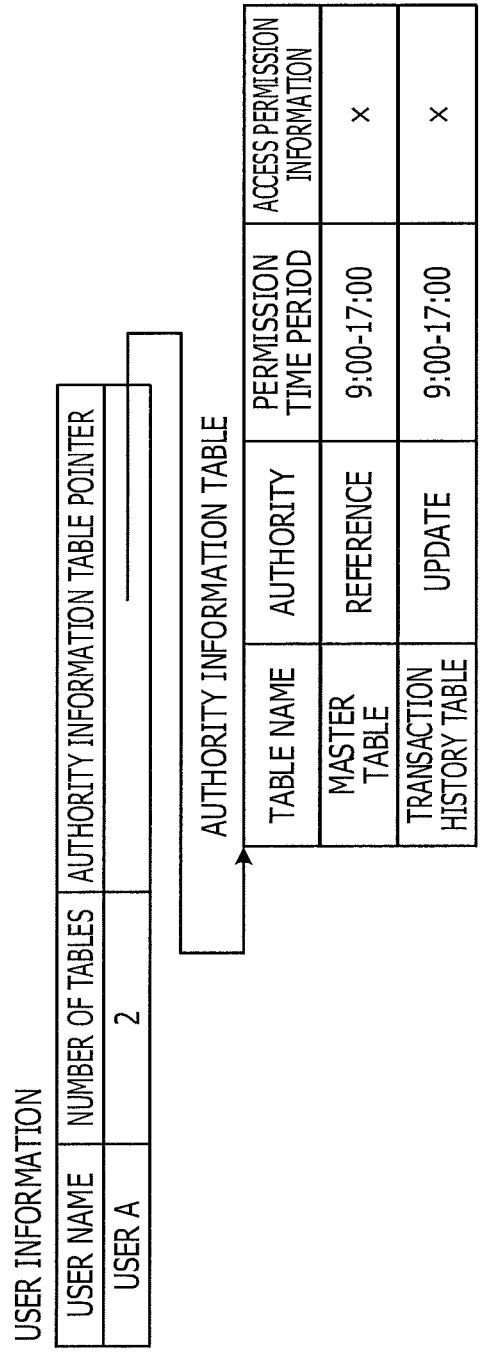
FIG. 11 illustrates one example of information of the user A that is registered by the flowchart in FIG. 10.

When there are the user name and the table name, the authority information management unit 506 sets the time period specified by the authority registration statement in the permission time period field in the authority information table 402 and sets the access permission information as access non-permission (X) (step S1003). After that, the authority information management unit 506 notifies the authority setting update unit 507 of the modification of the authority information table 402 (step S1004). In contrast, when there is no user name and table name, the process ends with an error because not yet registered (step S1005). Thus, a series of processing by the present flowchart is terminated. By executing the present flowchart, the permission time period and the access permission information are registered in the authority information table 402. FIG. 11 illustrates one example of the information of user A that is registered by the flowchart in FIG. 10.

Update of Access Permission Information by Authority Setting Update Unit

Figure 12:
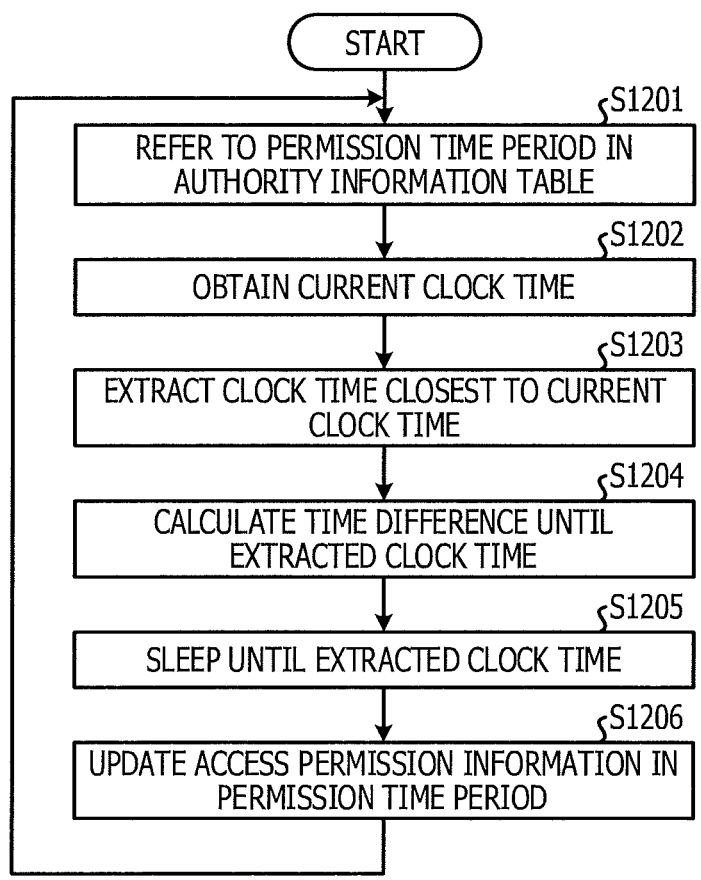
FIG. 12 is a flowchart illustrating one example of an update processing procedure of access permission information.

FIG. 12 is a flowchart illustrating one example of an update processing procedure of access permission information. Firstly, the authority setting update unit 507 carries out reference to the permission time period of the authority information table 402 (step S1201). After that, the authority setting update unit 507 obtains the current clock time (step S1202), and extracts clock time closest to the current clock time from the starting clock time and the ending clock time in the permission time period and also determines whether the clock time is the permission starting clock time or the permission ending clock time and saves the clock time (step S1203). The authority setting update unit 507 calculates a time difference from the current clock time to the extracted clock time (step S1204), and sleeps until the extracted clock time (step S1205). For example, the authority setting update unit 507 is capable of using sleep for the time difference. After that, when the extracted clock time is reached, the authority setting update unit 507 is released from the sleep and updates the access permission information in the permission time period (step S1206). The access permission information is updated to "O" when the clock time saved earlier is the permission starting clock time, and the access permission information is updated to "X" when the saved clock time is the permission ending clock time. Thus, a series of processing by the present flowchart is terminated. By executing the present flowchart, the access permission information of the authority information table 402 is updated.

Access Control in Database Server 101

Figure 13:
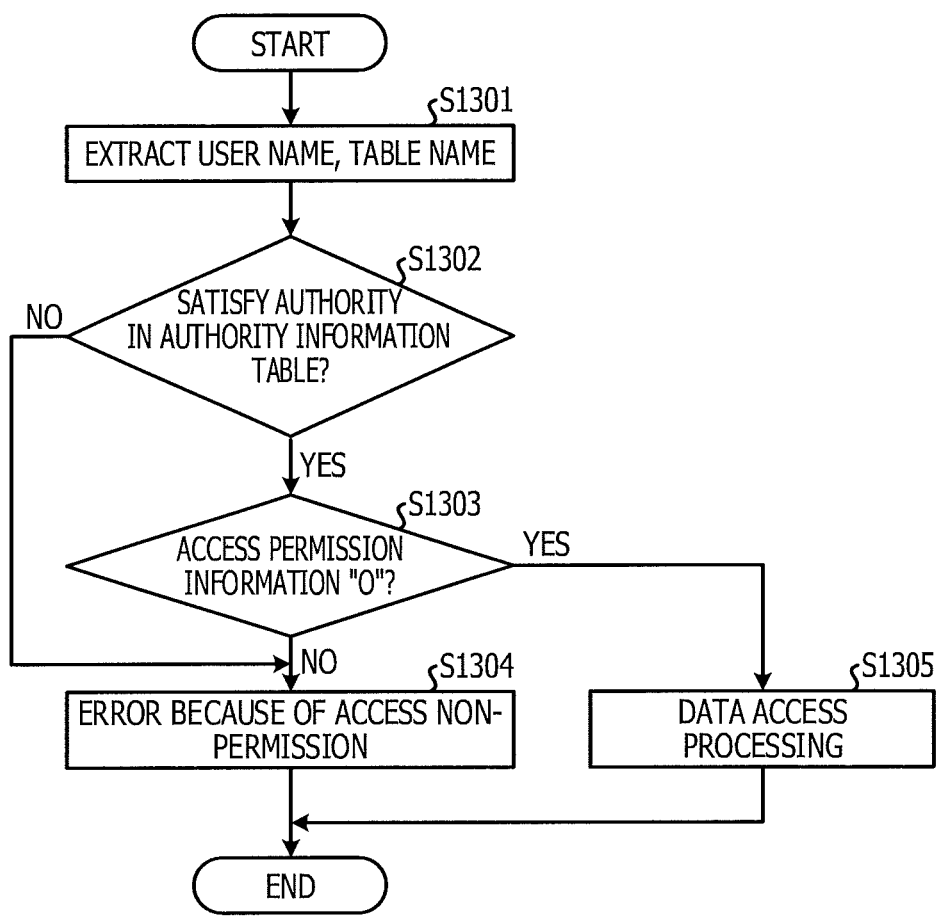
FIG. 13 is a flowchart illustrating one example of a test processing procedure of access authority by the database server.

FIG. 13 is a flowchart illustrating one example of a test processing procedure of access authority by the database server 101. The acceptance unit 501 accepts a data access demand (SQL statement) for the database server 101 from the client terminal 102. The SQL translation unit 502 extracts a user name that accesses data, a table name desired for data access, and the like from the SQL statement (step S1301). Next, the authority testing unit 503 specifies the authority information table 402 corresponding to the user from the authority information table pointer indicating the correspondence relationship between the user information 401 and the authority information table 402 in which the authority of the user is set, and tests whether or not the user is capable of accessing the table with reference to the authority of the specific authority information table 402 of the authority setting information 400 (step S1302). Here, the process goes on to step S1303 when the user is capable of accessing the table (yes in step S1302), and the process goes on to step S1304 when not capable of accessing (no in step S1302).

When the user is capable of accessing the table, the access permission testing unit 504 determines whether or not it is in the permitted time period with reference to the access permission information of the authority information table 402 (step S1303). Here, the process goes on to step S1305 when it is in the permitted time period (yes in step S1303), and the process goes on to step S1304 when it is not in the permitted time period (no in step S1303).

When it is in the permitted time period, the data access unit 505 accesses the database 210 in accordance with the access procedure and replies with the result to the acceptance unit 501 (step S1305). On the contrary, when the user is not capable of accessing the table or it is not in the permitted time period, the data access unit 505 returns an error of access non-permission (step S1304).

In this case, although an error is returned to a business application, it is possible to leave the handling of transaction to the operation policy of the utilization system and to select any of transaction continuation or transaction cancellation (handling equivalent to existing cancellation per SQL statement when an SQL statement error occurs). Thus, a series of processing by the present flowchart is terminated. By executing the present flowchart, the authority and the access permission information of the table are tested.

As described above, the database server 101 by the first embodiment gives the permission time period indicating the time period to permit access to a table and the access permission information indicating whether or not to permit a user to access the table at the current clock time to the authority information table 110. The database server 101 updates the access permission information in the background. The database server 101 refers to the access permission information when accessing data from the client terminal 102, thereby determining access permission. The database server 101, therefore, does not obtain the current clock time when accessing the data. Thus, it becomes possible to execute control of the access right based on the time period without increasing the processing time for data access. It is also possible to introduce a concept of available time for access authority management into a database system where high frequency, large amount of data, and high speed processing are demanded, for example, online transaction processing that processes data based on a processing demand by a user and immediately sends the processing result back to the user.

In addition, it is possible to achieve dynamic authority relationship in the database server 101 by introducing the idea of available time for authority. For example, it is possible to securely inhibit data access by limiting to specific users and utilization resources in a certain time period and the like for improvement in convenience and enhancement of security (guard mechanism). It is also possible to interrupt during data access by the database server 101 by testing access permission in the data access control. Therefore, the operating properties are improved such as avoiding overtime of planned ending clock time due to a delay of batch processing at night and a delay of online business starting time in the next morning.

The database server 101 updates the access permission information for a table to access permission at the starting clock time in the permission time period, updates the access permission information for a table to access non-permission at the ending clock time in the permission time period, and permits access to the table when the access permission information indicates access permission. Thus, the number of obtaining the current clock time by calling a system call of the OS by the database server 101 is limited to the number of the starting clock time and the ending clock time of the permission time period.

The database server 101 obtains the current clock time, extracts the clock time closest to the current clock time thus obtained among the starting clock time and the ending clock time in the permission time period, and sleeps until the extracted clock time, and when the extracted clock time is reached, updates the access permission information. Thus, the database server 101 is capable of sleeping between the starting clock time and the ending clock time of the permission time period.

Authority Definition of Time Regulation

It is possible to achieve time regulation that regulates the time period to permit access by newly creating a time regulation object and specifying the time regulation object when giving authority. For example, when night is defined as from 21 o'clock to 3 o'clock in the next morning (night T) and a business application to achieve certain batch processing (user A) is intended to be executed only at night, it is possible to execute from 21 o'clock to 27 o'clock by extending an ON phrase to the GRANT SQL statement. When specifying beyond the day, the specification is made as 23 o'clock, 24 o'clock, 25 o'clock, 26 o'clock, . . . indicating continuation from the last day.

CREATE TIME RANGE night T (21:00, 27:00)
GRANT activation authority TO user A ON night T Since the concept of time has continuity, the definition relationship sometimes contradicts when the concept is incorporated carelessly. For example, when the user A gives authority only from 21 o'clock to 25 o'clock to a user C, and the user B gives authority only from 24 o'clock to 28 o'clock to the same user C, a scheme is desired for how to interpret the three periods of from 21 o'clock to 24 o'clock, from 24 o'clock to 25 o'clock, and from 25 o'clock to 28 o'clock. With that, it is also possible to newly prepare an object of time regulation (TIME RANGE) to allow only separated time regulations in the system. In this case, it is not possible to define the time regulation having two overlapping periods of from 21 o'clock to 25 o'clock and from 24 o'clock to 28 o'clock, and it turns out to rotationally use three time regulations of from 21 o'clock to 24 o'clock, from 24 o'clock to 25 o'clock, and from 25 o'clock to 28 o'clock.

Second Embodiment

Next, descriptions are given to the database server 101 according to the second embodiment. Illustrations and descriptions are omitted for the identical parts that are described in the first embodiment.

In the first embodiment, permission for access by the time period is determined by the database server 101 with the access permission information per table. However, the database 210 is prone to have a large number of target tables. Therefore, in proportion to increase of the number of target tables, an amount of information of the permission time period and the access permission information increases, which results in an increase of memory use. Further, the database server 101 uses time for search and update of the permission time period and the access permission information. With that, in the second embodiment, the fields of the permission time period and the access permission information are aggregated to a permission time table 1403 based on the permission time period. Thus, the database server 101 achieves miniaturization of the permission time period and access permission information.

Figure 14:
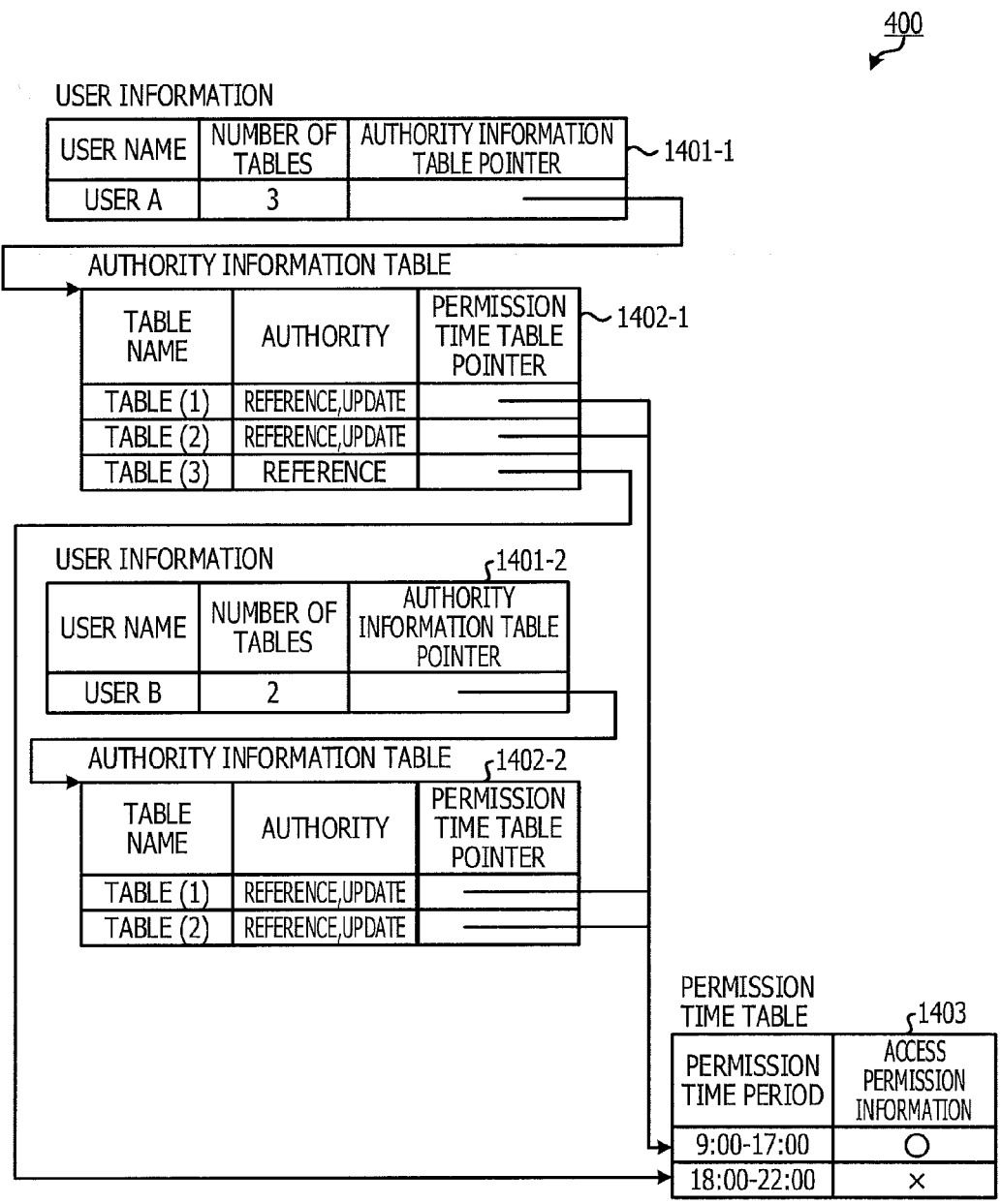
FIG. 14 illustrates one example of stored contents of the authority setting information according to a second embodiment.

FIG. 14 illustrates one example of stored contents of the authority setting information 400 according to the second embodiment. In FIG. 14, the authority setting information 400 is configured to include the user information 1401, an authority information table 1402, and the permission time table 1403. Here, the user information 1401 has the same configuration as the user information 401 in the first embodiment by FIG. 4.

In FIG. 14, the authority information table 1402 has a table name, authority, and a permission time table pointer and stores authority information of a user per table by setting information in each field.

Here, the table name and the authority have the same functions as the first embodiment by FIG. 4. The permission time table pointer is correspondence information indicating correspondence relationship with the columns of the permission time table 1403 in which the permission time period of the table is set. The permission time table pointer is a pointer indicating an address in the memory 302 of the column in the permission time table 1403 in which the permission time period of the table is set. For example, in FIG. 14, the permission time table pointer in the table (1) of an authority information table 1402-1 indicates an address in the column in the permission time period of 9:00-17:00 of the permission time table 1403 in which the permission time period is set, since the permission time period in the table (1) is 9:00-17:00. Similarly, the permission time table pointer in the table (2) of the authority information table 1402-1 indicates an address in the column in the permission time period of 9:00-17:00 of the permission time table 1403. Meanwhile, the permission time table pointer in the table (3) in the authority information table 1402-1 indicates an address in the column in the permission time period of 18:00-22:00 of the permission time table 1403.

In FIG. 14, the permission time table 1403 has fields of the permission time period and the access permission information and stores the access permission information per permission time period by setting information in each field. The permission time table 1403 is configured with columns, which are permission time information having the permission time period and the access permission information, and each column indicates the permission time period and the access permission information in the table having the correspondence relationship by the permission time table pointer. The permission time period and the access permission information have the same functions as the permission time period and the access permission information included in the authority information table 402 in the first embodiment by FIG. 4.

For example, in FIG. 14, the authority information table 1402-1 has the table (1) to the table (3) as the table name. The authority information table 1402-1 indicates that the user A is capable of referring to and updating the table (1) and indicates correspondence to the column in the permission time period of 9:00-17:00 in the permission time table 1403 by the permission time table pointer. The permission time table 1403 indicates that access is permitted in the time period of 9:00-17:00 and that the access permission information is "O" and access is permitted at the current clock time. Similarly, the authority information table 1402-1 indicates that the user A is capable of referring to the table (3) and indicates correspondence to the column in the permission time period of 18:00-22:00 in the permission time table 1403 by the permission time table pointer. The permission time table 1403 indicates that access is permitted in the time period of 18:00-22:00 and that the access permission information is "X" and access is not permitted at the current clock time.

When working with the authority setting information 400 in FIG. 14, the access permission testing unit 504 of the database server 101 specifies the column in the permission time table 1403 from the permission time table pointer indicating correspondence relationship between the table name and the column in the permission time table 1403 in which the permission time period of the table is set, and determines whether or not it is in the permitted time period with reference to the access permission information of the column.

The authority setting information 400 in FIG. 14 is an aggregation of the fields of the permission time period and the access permission information included in the authority information table 402 in FIG. 4 to the permission time table 1403 based on the permission time period. It is possible to aggregate utilizing the characteristics that the database 210 of the database server 101 is grouped by table normalization. It is possible to achieve miniaturization of the permission time period and the access permission information by this aggregation (grouping). Thus, the database server 101 is capable of reducing the time desired for search and update of the permission time period and the access permission information. For example, in the authority setting information 400 in FIG. 4, the authority setting update unit 507 is desired to refer to and update the five permission time periods and the access permission information, while the authority setting update unit 507 may only refer to and update the two permission time periods and the access permission information in the authority setting information 400 in FIG. 14.

While a permission time table pointer is provided per table name of the authority information table 1402, it is also possible to provide a plurality of permission time table pointers to one table name. Thus, the authority information table 1402 becomes capable of permitting a plurality of time periods to one table, such as 9:00-11:00 and 15:00-17:00.

Figure 15:
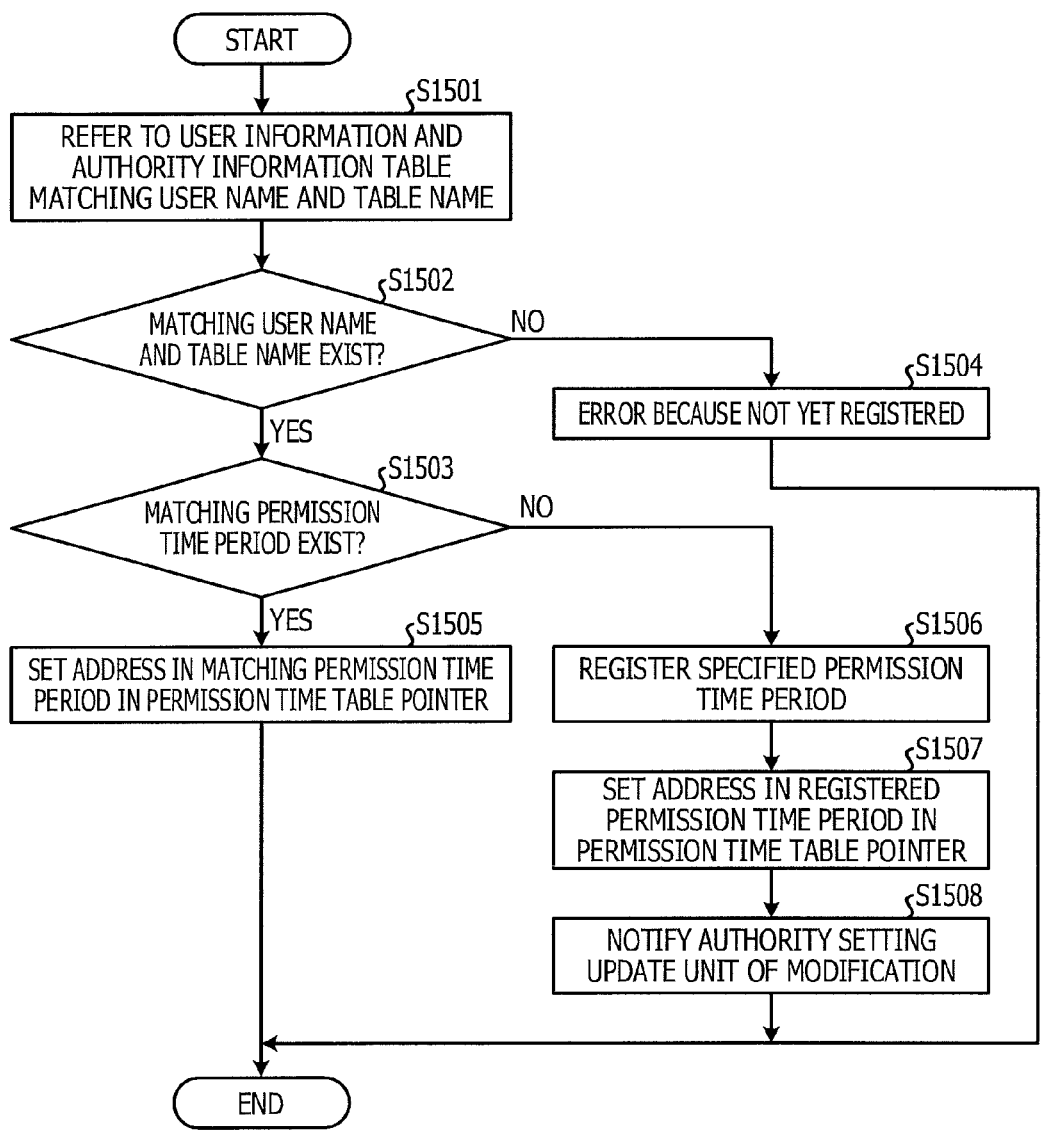
FIG. 15 is a flowchart illustrating one example of a user permission time period registration processing procedure of the authority setting information according to the second embodiment.

FIG. 15 is a flowchart illustrating one example of a user permission time period registration processing procedure of the authority setting information 400 according to the second embodiment. It is possible to achieve the user registration of the authority setting information 400 and the user authority registration of the authority setting information 400 by the same flowchart as the authority setting information 400 in FIG. 4.

Firstly, the authority information management unit 506 refers to the user information 401 and the authority information table 402 matching the user name and the table name based on the authority registration statement (GRANT statement) (step S1501). The authority registration statement is described as, for example, GRANT PERMISSION_TIME TO user A ON TABLE master table, transaction history table WITH TIME_RANGE (9:00, 17:00)

GRANT PERMISSION_TIME TO user B ON TABLE master table, transaction history table WITH TIME_RANGE (9:00, 17:00).

Next, the authority information management unit 506 confirms whether or not there are the matching user name and the table name (step S1502). Here, the process goes on to step S1503 when there are the user name and the table name (yes in step S1502), and the process goes on to step S1504 when there is none (no in step S1502).

When there are the user name and the table name, the authority information management unit 506 refers to the permission time table 1403 and confirms whether or not there is the permission time period matching the permission time period of the authority registration statement (step S1503). Here, the process goes on to step S1505 when there is the matching permission time period, and the process goes on to step S1506 when there is none. In contrast, when there is no user name and table name, the process ends with an error because not yet registered (step S1504).

Figure 16:
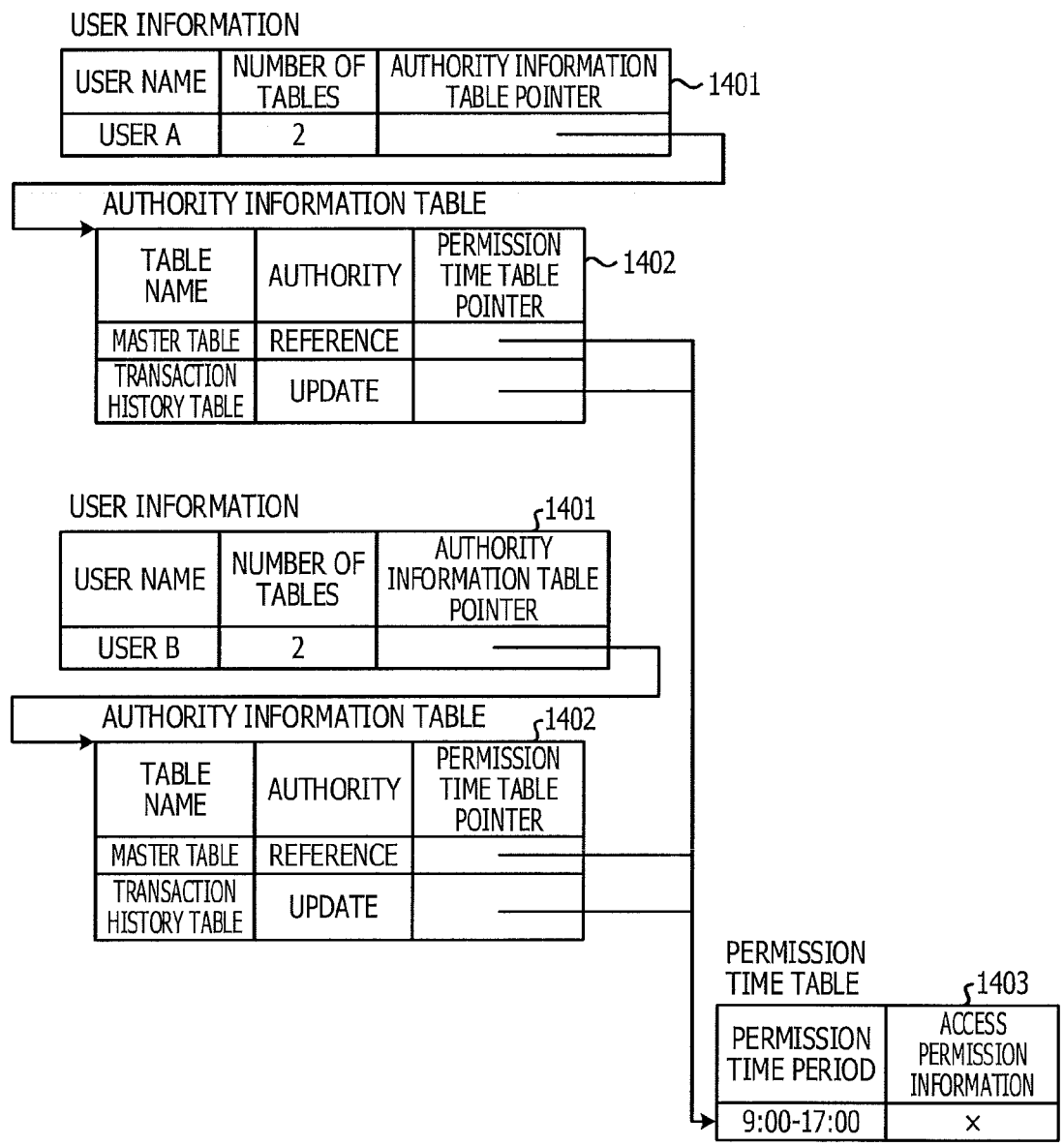
FIG. 16 illustrates one example of information of a user A and a user B that are registered by the flowchart in FIG. 15.

When there is the matching permission time period, the authority information management unit 506 sets an address in the matching permission time period as the permission time table pointer in the authority information table 1402 (step S1505). On the contrary, when there is no matching permission time period, the authority information management unit 506 registers the permission time period specified at this time in the permission time table 1403 and sets the access permission information as access non-permission (X) (step S1506). After that, the authority information management unit 506 sets the address in the registered permission time period in the permission time table pointer in the authority information table 1402 (step S1507) and notifies the authority setting update unit 507 of the modification of the authority information table 402 (step S1508). Thus, a series of processing by the present flowchart is terminated. By executing the present flowchart, the permission time period and the access permission information are registered in the permission time table 1403. FIG. 16 illustrates one example of the information of user A and user B that is registered by the flowchart in FIG. 15.

As described above, the database server 101 according to the second embodiment updates the access permission information depending on the permission time period based on the permission time table 1403 having the columns representing the permission time period and the access permission information in correspondence. The database server 101 specifies the column corresponding to the table name from the pointer indicating the correspondence relationship between a table name and the column in which the permission time period of the table is set in the permission time table 1403, and controls access to the table based on the access permission information of the specified column. Thus, it is possible to achieve miniaturization of the permission time period and the access permission information, and it is possible to reduce the time used for search and update of the permission time period and the access permission information by the database server 101.

Third Embodiment

Next, descriptions are given to the database server 101 according to the third embodiment. Illustrations and descriptions are omitted for the identical parts that are described in the first and second embodiments.

In the first and second embodiments, the database server 101 determines access permission by the time period to all users. Therefore, a user to which the time regulation is not given is not capable of carrying out data access. With that, in the third embodiment, it becomes possible for a user to which the time regulation is not given to access data by testing whether or not the time regulation is given.

Figure 17:
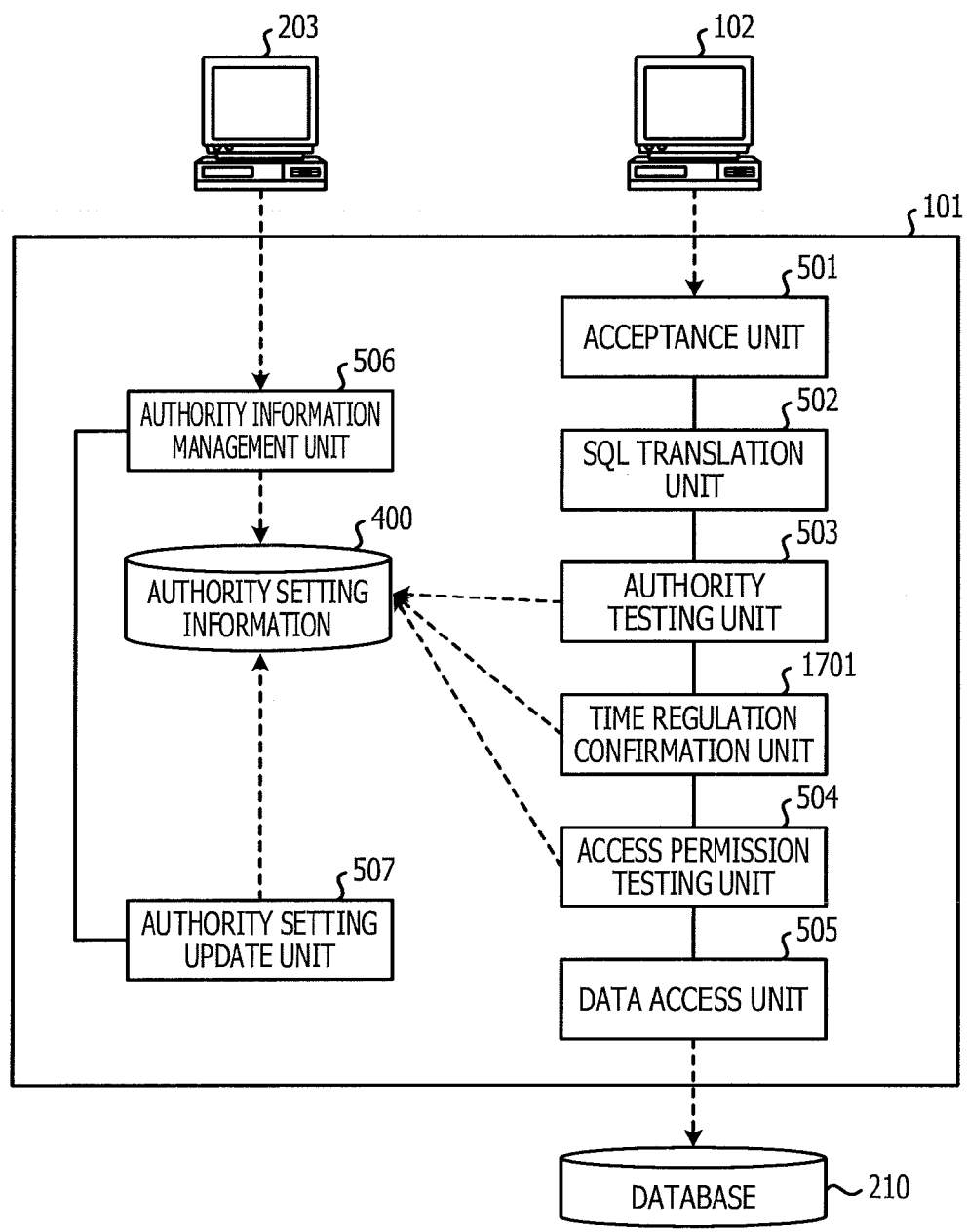
FIG. 17 is a block diagram illustrating a functional configuration example of a database server according to a third embodiment.

FIG. 17 is a block diagram illustrating a functional configuration example of the database server 101 according to the third embodiment. In FIG. 17, the database server 101 is configured to include the acceptance unit 501, the SQL translation unit 502, the authority testing unit 503, a time regulation confirmation unit 1701, the access permission testing unit 504, the data access unit 505, the authority information management unit 506, and the authority setting update unit 507. Each functional unit is executed in a similar manner to the functional unit illustrated in FIG. 5 and the processing result is stored.

The time regulation confirmation unit 1701 has a function that tests whether or not the time regulation is given referring to information of a user. When the time regulation is not given to the user, data access is permitted to the user without testing by the access permission testing unit 504. It is possible to determine whether or not the time regulation is given by, for example, whether the permission time period is set in the authority information table 402 of the execution user or whether or not a value is set in the permission time table pointer in the authority information table 1402.

Figure 18:
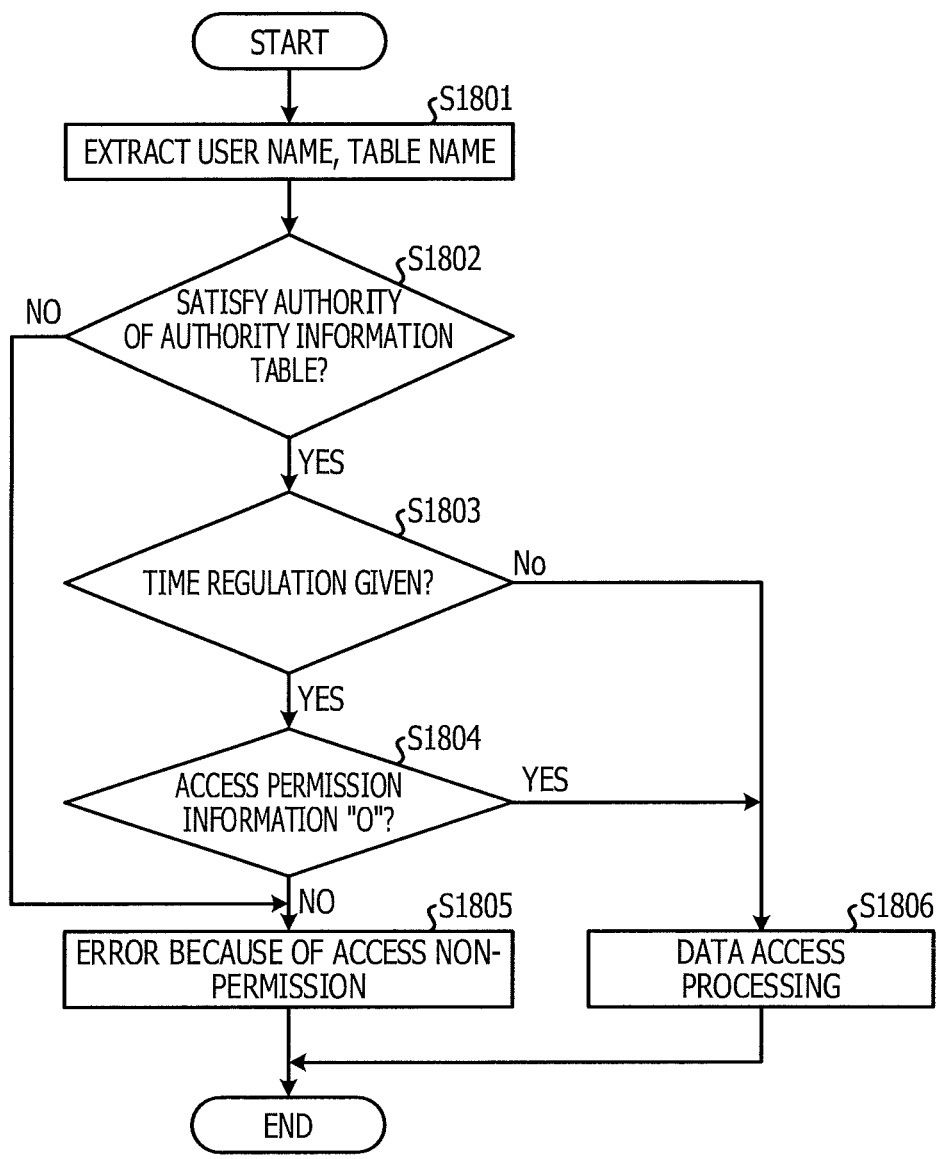
FIG. 18 is a flowchart illustrating one example of a test processing procedure of access authority by the database server according to the third embodiment.

FIG. 18 is a flowchart illustrating one example of a test processing procedure of access authority by the database server 101 according to the third embodiment. Step S1801 and step S1802 are steps to execute the same processing as step S1301 and step S1302 in FIG. 13, respectively. When the user is capable of accessing the table, the time regulation confirmation unit 1701 tests whether or not the time regulation is given referring to user information (step 1803). Here, the process goes on to step S1804 when the time regulation is given to the user (yes in step S1803), and the process goes on to step S1806 when the time regulation is not given (no in step S1803).

When the time regulation is given to the user, the same processing as step S1303 and later in FIG. 13 is executed (steps S1804-S1806). On the contrary, when the time regulation is not given, the database 210 is accessed in accordance with an access procedure and the result is sent back to the acceptance unit 501 (step S1806). Thus, a series of processing by the present flowchart is terminated. By executing the present flowchart, the authority of the table, giving of time regulation, and the access permission information are tested.

As described above, the database server 101 according to the third embodiment executes processing to specify the authority information table 402 corresponding to a user name from a pointer indicating correspondence relationship between the user name and the authority information table 402. When a pointer indicating the correspondence relationship with the columns in which the permission time period of the table is set in the permission time table 1403 in the specified authority information table 402, the database server 101 specifies permission time information corresponding to the table name from the pointer. Thus, the time regulation confirmation unit 1701 refers to the user information and tests whether or not the time regulation is given, and thus the database server 101 allows a user to which the time regulation is not given to carry out data access.

The access control program described in the present embodiment may be achieved by executing a program prepared in advance in a computer, such as a personal computer and a workstation. The present access control program is recorded in a computer readable recording medium, such as a hard disk, a flexible disk, a CD-ROM, an MO, and a DVD, and is executed by being read out of the recording medium by the computer. The present access control program may also be distributed via a network, such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus comprising:
   a memory; and
   a processor coupled to the memory and configured to:
   set an access permission indicator for data when a start time of a time zone for permission arrives, the access permission indicator for the data indicating an access to the data is allowed when a time of the access to the data is within the time zone;
   set the access permission indicator for the data when an end time of the time zone for the permission arrives, the access permission indicator for the data indicating the access to the data is not allowed; and
   determine whether to allow the access to the data on basis of the access permission indicator set for the data indicating whether to permit access to the data, when the access to the data is requested.

2. The apparatus of claim 1, wherein the processor is further configured to:

monitor time between operations other than the access to the data;

determine whether at least one of the start time or the end of time arrives on basis of the monitored time.

3. The apparatus of claim 2, wherein the processor is configured to set the indicator independently of timing of a request for the access to the data.

4. The apparatus of claim 1, wherein the processor is configured to determine whether to allow the access to the data on basis of the access permission indicator set for the data without obtaining time when the access to the data is requested.

5. The apparatus of claim 1, wherein the processor is further configured to change the time zone to a different time zone.

6. The apparatus of claim 1, wherein the apparatus is a single server.

7. The apparatus of claim 1, wherein the processor is further configured to:

access the data when determined that the access to the data is allowed; and reply a result of the access to the data.

8. A non-transitory computer-readable medium including a program, which when executed by a computer, causes the computer to:

set an access permission indicator for data when a start time of a time zone for permission arrives, the access permission indicator for the data indicating an access to the data is allowed when a time of the access to the data is within the time zone;

set the access permission indicator for the data when an end time of the time zone for the permission arrives, the access permission indicator for the data based indicating the access to the data is not allowed; and determine whether to allow the access to the data on basis of the access permission indicator set for the data indicating whether to permit access to the data, when the access to the data is requested.

9. A method comprising:

setting an access permission indicator for data when a start time of a time zone for permission arrives, the access permission indicator for the data based indicating an access to the data is allowed when a time of the access to the data is within the time zone;

setting the access permission indicator for the data when an end time of the time zone for the permission arrives, the access permission indicator for the data indicating the access to the data is not allowed; and determining whether to allow the access to the data on basis of the access permission indicator set for the data indicating whether to permit access to the data, when the access to the data is requested.

10. The method of claim 9, further comprising:

monitoring time between operations other than the access to the data; and determining whether at least one of the start time or the end of time arrives on basis of the monitored time.

11. The method of claim 10, wherein the setting sets the indicator independently of timing of a request for the access to the data.

12. The method of claim 9, further comprising:

determining whether to allow the access to the data on basis of the access permission indicator set for the data without obtaining time when the access of the data is requested.

13. The method of claim 9, further comprising:

changing the time zone to a different time zone.

14. The method of claim 9, further comprising:

accessing the data when determined that the access to the data is allowed; and replying a result of the accessing the data.

* * * * *